US007020279B2

(12) United States Patent
Usman et al.

(10) Patent No.: US 7,020,279 B2
(45) Date of Patent: Mar. 28, 2006

(54) METHOD AND SYSTEM FOR FILTERING A SIGNAL AND FOR PROVIDING ECHO CANCELLATION

(75) Inventors: Mohammad Usman, Mission Viejo, CA (US); Jon Laurent Pang, Huntington Beach, CA (US); Amjad Luna, Aliso Viejo, CA (US); Imtinan Elahi, Lake Forest, CA (US)

(73) Assignee: Quartics, Inc., Irvine, CA (US)

(*) Notice: Subject to any disclaimer, the term of this patent is extended or adjusted under 35 U.S.C. 154(b) by 510 days.

(21) Appl. No.: 10/038,367

(22) Filed: Oct. 19, 2001

(65) Prior Publication Data

US 2003/0076950 A1 Apr. 24, 2003

(51) Int. Cl.
*H04M 9/08* (2006.01)

(52) U.S. Cl. ........................... 379/406.08; 379/406.01; 379/406.06; 379/406.09

(58) Field of Classification Search .............................. 379/406.01–406.16
See application file for complete search history.

(56) References Cited

U.S. PATENT DOCUMENTS

| | | | | |
|---|---|---|---|---|
| 5,633,863 | A * | 5/1997 | Gysel et al. | 370/290 |
| 5,774,564 | A * | 6/1998 | Eguchi et al. | 381/71.11 |
| 6,141,406 | A * | 10/2000 | Johnson | 379/189 |
| 6,266,367 | B1 * | 7/2001 | Strait | 375/229 |
| 6,549,587 | B1 * | 4/2003 | Li | 375/326 |
| 6,597,732 | B1 * | 7/2003 | Dowling | 375/222 |
| 6,724,736 | B1 * | 4/2004 | Azriel | 370/286 |
| 2002/0101981 | A1 * | 8/2002 | Sugiyama | |

OTHER PUBLICATIONS

Akihiko, "Method and Apparatus for Cancelling Multi-channel Echo", Aug. 1, 2002, PG-PUB.*

Williamson et al , "Globally Convergent Adaptive IIR Filters Based on Fixed Pole Locations", 1996, IEEE Trans. on Signal Processing, vol. 44, No. 6, Jun. 1996, pp. 1418-1427.*

Fan et al, "An Invstigation of an Adaptive IIR Echo Canceller: Advantages and Problems", 1988, IEEE Trans. on Acoustics, Speech and Siganl Processing, vol. 16, No. 12, Dec. 1988, pp. 1819-1834.*

(Continued)

*Primary Examiner*—Sinh Tran
*Assistant Examiner*—Ramnandan Singh
(74) *Attorney, Agent, or Firm*—Patent Metrix

(57) ABSTRACT

The present invention provides for adaptive filters that have improved computational and memory bandwidth proprieties. When applied to telecommunication applications, the present invention additionally provides for improved methods and systems of canceling echoes. In one embodiment of the adaptive filter of the present invention, a filter, preferably an adaptive finite impulse response (FIR) filter, of an appropriate length, N, is chosen. Once the filter is chosen, convergence is achieved and the filter is converted to an infinite impulse response (IIR) filter. In the course of operation, data is received from an input source and used to adapt the zeroes of the IIR filter using the least means square (LMS) approach, keeping the poles fixed. The adaptation process generates a set of converged filter coefficients that are then applied to the input signal to create a modified signal used to filter the data. The novel adaptive filter method and system presented herein can be used to improve the calculation of the echo impulse response by, among other things, reducing the computational complexity and memory requirements of the coefficient calculation conducted within the adaptive filter.

3 Claims, 13 Drawing Sheets

OTHER PUBLICATIONS

Kaelin et al, "Linear Echo Cancellation Using Optimized Recursive Prefiltering", 1993, IEEE Int. Symp. on Circuits and Systems ISCAS '93, May 3-6, 1993, pp. 463-=466, vol. -1.*

* cited by examiner

METHOD AND SYSTEM FOR FILTERING A SIGNAL AND FOR PROVIDING ECHO CANCELLATION

FIELD OF THE INVENTION

The present invention relates generally to an adaptive filter with improved operational characteristics, and, more specifically, to methods and systems of achieving echo cancellation employing the improved adaptive filter.

BACKGROUND OF THE INVENTION

Adaptive filters are used in numerous applications to remove undesired frequencies from a signal. In an exemplary application, adaptive filters are used in telecommunication systems, more specifically in echo cancellation systems, to remove from a signal echoes that may arise as a result of the reflection and/or retransmission of modified input signals back to the originator of the input signals. Commonly, echoes occur when signals that were emitted from a loudspeaker are then received and retransmitted through a microphone (acoustic echo) or when reflections of a far end signal are generated in the course of transmission along hybrids wires (line echo).

Although undesirable, echo is tolerable in a telephone system, provided that the time delay in the echo path is relatively short; however, longer echo delays can be distracting or confusing to a far end speaker. Understandably, the telecommunications industry has devoted substantial resources to developing systems that minimize echo, without adversely affecting the ability of two speakers to communicate with one another.

Acoustic echo often occurs in speakerphones that employ one or more microphones together with one or more speakers to enable "hands-free" telephone communication. Line echo originates because telephone facilities usually comprise two-wire circuits within each area connecting individual subscribers with the switching office and four-wire transmission circuits between switching offices in different local exchange areas. A call between subscribers in different exchange areas is carried over a two-wire circuit in each of the areas and a four-wire circuit between the areas, with conversion of speech energy between the two and four-wire circuits being conducted by hybrid circuits. If the hybrid circuit input ports had perfectly matched impedances of the two and four-wire circuits, the signals transmitted from one exchange area to the other would not be reflected or returned to the first area as echo. Unfortunately, due to impedance differences that inherently exist between different two and four-wire circuits, and because impedances must be matched at each frequency in the voice band, it is difficult for a given hybrid circuit to perfectly match the impedances of any particular two and four-wire transmission circuit.

To substantially remove echoes from a communication system, echo cancellation systems and methods employ adaptive filters to generate an estimate of the echo-generating signal (echo estimate) that is then removed from the signal being transmitted back to the originator of the echo-generating signal (far-end source). More specifically, a far-end source transmits a signal (far-end signal) that passes through a connection medium and into an input terminal of a communication unit. The far-end signal received at the input terminal is cross-coupled via a cross-coupling path (either acoustically or in line) and creates a cross-coupling echo component. That echo component combined with a new signal from the near-end (near-end signal) is transmitted back to the far-end source as a composite output signal. In this system, an echo canceller is conventionally deployed to monitor the far-end signal and generate an estimate of the actual echoes expected to return in the form of a composite signal with the near-end signal. The echo estimates are then applied to a subtractor circuit in the transmit channel to remove or at least reduce the actual echo.

To create an accurate estimate of the actual echoes, various types of adaptation methods are known in the prior art and can be employed in the echo canceller in the form of an adaptive filter. Conventionally, a finite impulse response (FIR) filter is used which carries out the convolution between the far-end signal and the estimated impulse response, N samples in length, of the echo paths. In the most basic model, an adaptive filter (filter vector) operates on a far-end signal vector to produce an estimate of the echo, which is subtracted from the combined near-end and echo signal. The overall output of the adaptive echo canceller is then used to control adjustments made to tap values of the filter vector.

In the aforementioned application, and other applications requiring the use of adaptive filters, a critical design requirement is the ability of the filter system to achieve convergence in a rapid, stable manner and, in the process, use a minimal amount of computational resources. A trade-off traditionally exists between stability, accuracy, and speed of convergence of an adaptive filter.

In that regard, digital filters are commonly categorized into two classes: infinite-length impulse response (IIR) filters and finite-length impulse response (FIR) filters. FIR filters have certain advantages relative to IIR filters, namely that FIR filters are stable and have a linear-phase response. Linear-phase FIR filters are widely used in digital communication systems, image processing, speech processing, spectral analysis and applications where non-linear phase distortion cannot be tolerated. Compared to IIR filters, FIR filters generally require shorter data word length but have much higher orders for the same magnitude specification and, at times, introduce large delays that make them unsuitable for certain applications. For example, when dealing with a system where echo cancellation must be performed for hundreds of channels on the same processor, the use of a conventional linear finite impulse response (FIR) filter to model a long impulse response requires substantial memory and computational resources.

Notwithstanding the above, different types of adaptive filter systems have been employed in echo cancellation systems that attempt to improve the rate of convergence and stability, while still minimizing the computational resources required. U.S. Pat. No. 5,995,620 discloses a method of canceling an echo that, according to the inventors, has an improved convergence time with low complexity. The echo cancellation method includes the step of canceling the echo in a far-end signal with a Kalman filter having a time varying Kalman gain vector K(t) proportion to the vector $$(p_1(t)x(t-1)\ \ldots\ p_n(t)x(t-n))^T$$

where $p_i(t)$ are the diagonal elements of a diagonal matrix P(t) satisfying a Riccati equation, i denotes the ith diagonal elements of P(t), t denotes discrete time, n denotes the number of filter taps, and T denotes transpose.

Despite the aforementioned prior art, an adaptive filter is still needed that achieves rapid convergence without an increase in computational resources or the introduction of instability. Additionally, a method and system of echo cancellation having an improved computational speed, while still remaining stable and minimizing the computational resources required, is also needed.

SUMMARY OF THE INVENTION

The present invention is directed toward a novel adaptive filter and novel methods and systems for conducting echo cancellation in telecommunication systems. In one embodiment of the adaptive filter of the present invention, a filter is chosen, preferably an adaptive finite impulse response (FIR) filter of an appropriate length N. Once the filter is chosen, convergence is achieved using a convergence process. With convergence complete, the filter is converted to an infinite impulse response (IIR) filter using a generalization of the ARMA-Levinson approach. In the course of operation, data is received from an input source and used to adapt the zeroes of the IIR filter using the least-mean-square (LMS) approach, keeping the poles fixed. The adaptation process generates a set of converged filter coefficients that are then applied to the input signal to create a modified signal used to filter the data. The error between the modified signal and actual signal received is monitored and used to further adapt the zeroes of the IIR filter.

In a second embodiment of the adaptive filter of the present invention, a filter is chosen, preferably an adaptive finite impulse response (FIR) filter of an appropriate length N. Once the filter is chosen, convergence is achieved using a convergence process. With convergence complete, the filter is converted to an infinite impulse response (IIR) filter using a generalization of the ARMA-Levinson approach. In the course of operation, data is received from an input source and used to adapt the zeroes of the IIR filter using the LMS approach, keeping the poles fixed. The adaptation process generates a set of converged filter coefficients that are then applied to the input signal to create a modified signal used to filter the data. The error between the modified signal and actual signal received is monitored and used to further adapt the zeroes of the IIR filter. If the measured error is greater than a pre-determined threshold, convergence is re-initiated by reverting back to the FIR convergence step.

The present invention is also directed toward an exemplary use of the novel adaptive filter method and system, namely novel media gateways, echo cancellation, and channel equalization methods and systems. Used in media gateways and echo cancellation systems, adaptive filters are used to generate an echo signal component used to cancel the echo generated by the engagement of a far-end signal with a cross-coupling path. The novel adaptive filter method and system presented herein can be used to improve the calculation of the echo impulse response by, among other things, reducing the computational complexity and memory requirements of the coefficient calculation conducted within the adaptive filter. In one embodiment, the novel filter of the present invention is used to generate the echo signal component. After having achieved convergence on a FIR filter and converted the filter to an IIR filter, in accordance with the previously described methodology, the adaptive filter generates an echo estimate by obtaining individual samples of the far-end signal on a receive path, convolving the samples with the calculated coefficients, and then subtracting, at the appropriate time, the resulting echo estimate from the received signal y on the transmit channel. Ongoing adaptation of the filter occurs by the adjustment of the zeroes of the IIR filter.

In a preferred embodiment of an echo cancellation application, the converged FIR filter is truncated by taking a first set of taps, K, from the truncated FIR filter, taking the last N-K taps of the truncated FIR filter, referred to as $h_{iir}$, and converting $h_{iir}$ to an IIR model, where K is preferably at or around 10. The truncated FIR filter, together with the IIR filter, is then used in combination to track the system response and filter data.

The present invention provides for adaptive filters that have improved convergence, computational, and memory bandwidth proprieties. When applied to telecommunication applications, the present invention additionally provides for improved methods and systems of canceling echoes.

BRIEF DESCRIPTION OF THE DRAWINGS

These and other features and advantages of the present invention will be appreciated as they become better understood by reference to the following Detailed Description when considered in connection with the accompanying drawings, wherein.

DETAILED DESCRIPTION OF THE INVENTION

Figure 1:
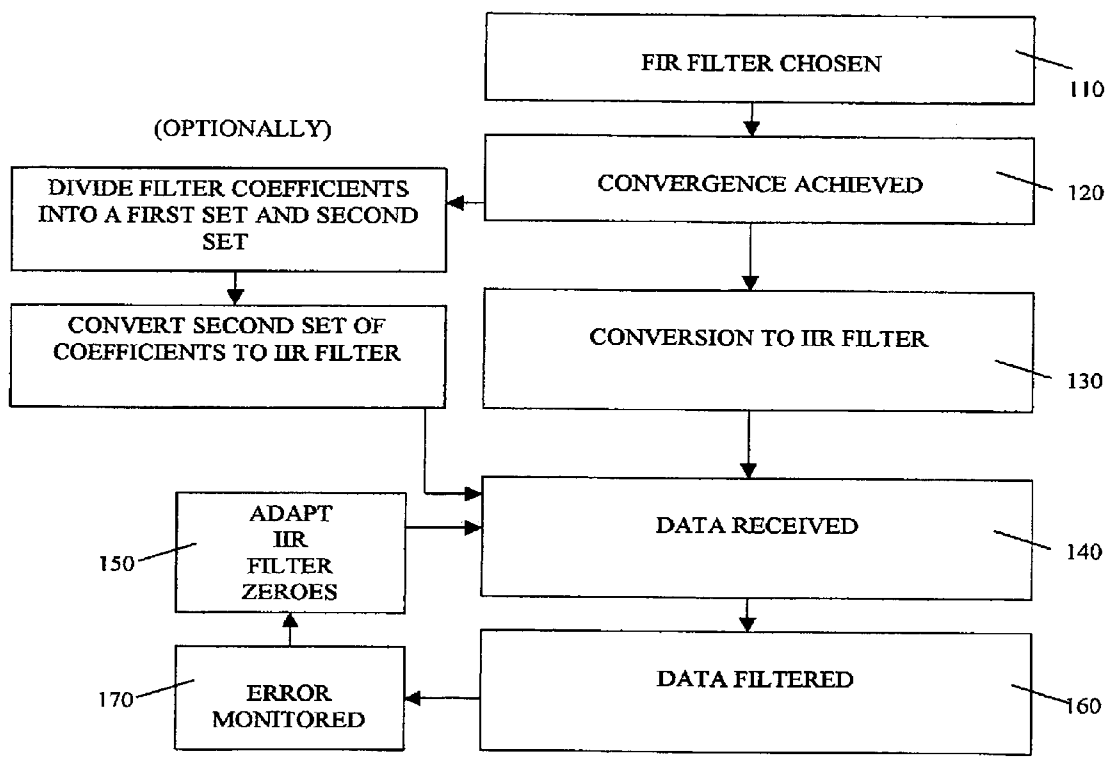
FIG. 1 is a flowchart describing the operation of one embodiment of an adaptive filter method of the present invention.
Figure 2:
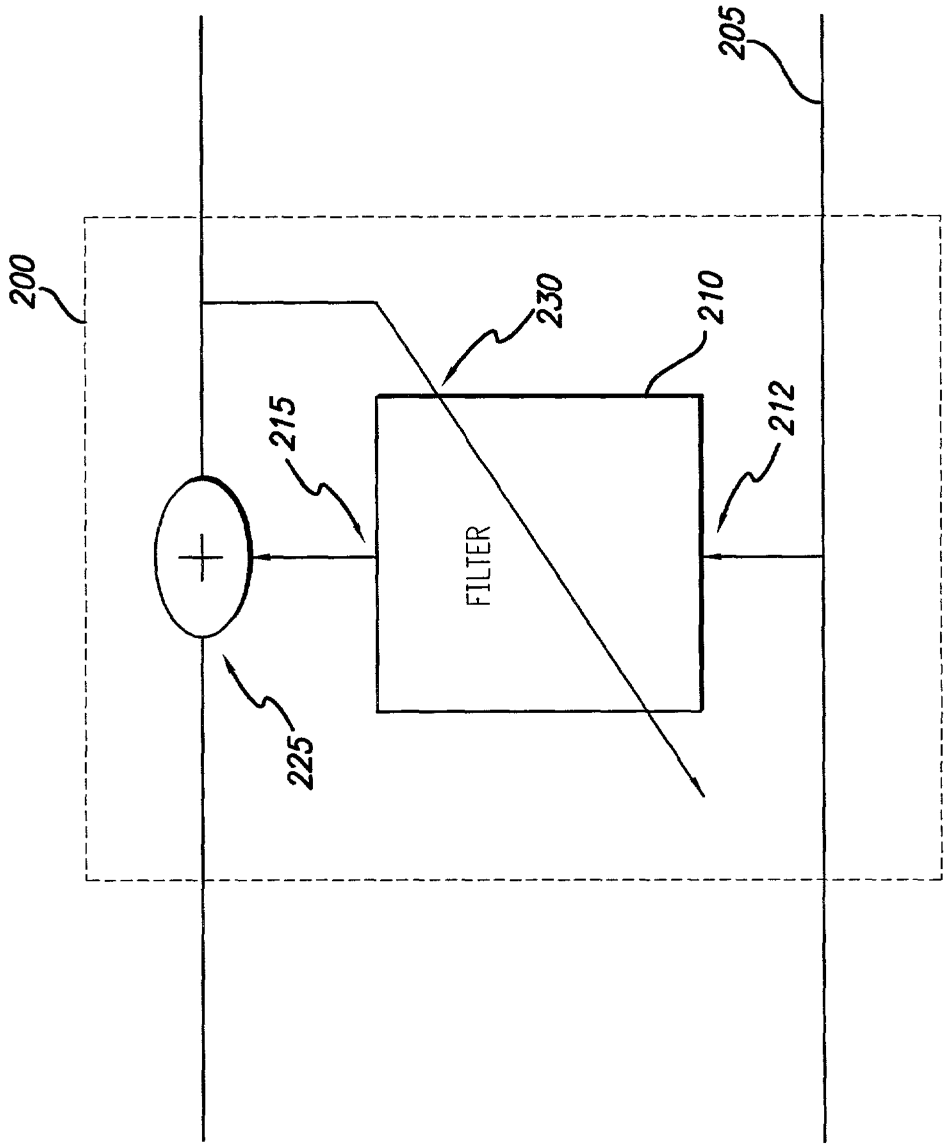
FIG. 2 is a block diagram of one embodiment of the novel adaptive filter system.

Referring now to FIG. 1, a novel adaptive filter method is shown. A filter is chosen 110, preferably an adaptive finite impulse response (FIR) filter of an appropriate length N. Once the filter is chosen 110, convergence is achieved 120 using a convergence process, preferably a least-mean-square (LMS) approach. With convergence complete 120, the filter is converted 130 to an infinite impulse response (IIR) filter using a generalization of the ARMA-Levinson approach. In the course of operation, data is received 140 from an input source and used to adapt 150 the zeroes of the IIR filter using the LMS approach, keeping the poles fixed. The adaptation process 150 generates a set of converged filter coefficients that are then applied to the input signal to create a modified signal used to filter 160 the data. The error between the modified signal and actual signal received is monitored 170 and used to further adapt the zeroes of the IIR filter. Structurally, as shown in FIG. 2, the adaptive filter system 200 comprises a filter 210 having a filter input 212 for receiving inputs from a far-end source 205, a filter output 215 for outputting a filtered result to a summation device 225, and an error input 230 for receiving an error signal generated by the comparison of an estimated signal against the actual signal.

The present system will be further described by specific reference to a finite impulse response (FIR) filter. An FIR system is generally described by the difference equation:

$$y_k = \sum_{i=0}^{N} h_i x_{k-1}$$

where $y_k$ represents an output signal that is the summation of the convolution of $h_i$ with input signal $x_{k-i}$. One of ordinary skill in the art would appreciate that there are several methods for implementing an FIR system, including direct form, cascade-form, frequency-sampling, and lattice realizations. While the embodiments of the present invention will be described by reference to a direct form realization, the invention is not limited to direct form realizations and encompass any realization that could be effectively utilized in accordance with the teachings provided herein.

Designing a FIR filter requires the determination of N coefficients from a specification of the desired frequency response of the FIR filter. One of ordinary skill in the art would appreciate how to design a FIR system for a particular application and, more specifically, to define the appropriate length of the FIR filter. In the case of FIR filters being designed for echo cancellation applications, the desired frequency response of the FIR filter is to mimic the behavior of a cross-coupling transformation of a far-end signal, namely the nature and extent of the impulse response generated by the echo path. As such, the length of the FIR filter, designated by N, is calculated based upon the length of the impulse response that needs to be cancelled. For line echo cancellation, the impulse response is typically specified to be 64 ms in duration. The FIR filter length can therefore be approximated by multiplying the expected duration of the echo response, i.e., 64 ms, by the standard sampling rate in telephony systems, 8 kHz. In this case, the FIR filter would comprise 512 coefficients or 512 taps.

The taps, also referred to as coefficients or filter coefficients, of the FIR filter can be realized by using a convergence process that employs any one of several known approaches. To achieve convergence, the approach would typically have to derive a set of filter coefficients that, when applied to an input signal, would generate a signal that was sufficiently close to (converged with) the signal that needed to be filtered. In the aforementioned echo cancellation application, the approach would have to update the filter coefficients once every sample, or every 125 microseconds. The more filter coefficients that need to be updated, the more computational resources and memory that are needed by the filter system. Reducing the number of coefficients would therefore reduce the computational complexity and memory requirements of the adaptive filter. This reduction becomes even more critical when dealing with applications requiring numerous adaptive filter operations, such as multi-channel echo cancellation devices.

A conventionally used approach to achieve convergence comprises the LMS approach. One of ordinary skill in the art would appreciate the calculation that needs to be conducted in order to conduct a convergence process using the LMS approach. Conceptually, by effectuating convergence, the LMS approach enables the determination of values for a set of filter coefficients that comprise a transfer function that best approximates the transformation of an input signal to the noise-containing output signal via a channel. In the case of an echo cancellation application, the LMS approach enables the determination of values for a set of filter coefficients that comprise a transfer function which best approximates the transformation of an input signal to the echo-containing output signal via a cross-coupling pathway. Depending on the length of the FIR filter, the LMS approach can be computationally complex and therefore comprise the most computationally intensive part of any filtration process. Additionally, the LMS approach exhibits slow convergence and requires the trial-and-error determination of an adaptation coefficient, denoted by $\mu$, which controls the speed of convergence and, if improperly selected, effects the stability of the convergence calculation.

Other approaches can be used and may be selected based upon a balance of factors including the rate of convergence, computational requirements, stability, and other properties. The rate of convergence is defined as the number of iterations required for the convergence process, in response to a set of inputs, to converge to the optimum solution. The computational requirements of the convergence process includes: (a) the number of operations (i.e., multiplications, divisions, additions, and subtractions) required to make one complete iteration of the convergence process; (b) the amount of memory needed to store the convergence process and accompanying data; and (c) the engineering investment required to program the convergence process.

As with other recursive algorithmic approaches, the LMS approach computes the coefficient values from the error signal by starting from some set of initial conditions that preferably approximates an assumed initial state of the system and iteratively configuring the taps to minimize the error signal when calculated in some mean-squared sense.

More specifically, given an input vector $\overline{u}$, and a vector of filter coefficients or weights, $\overline{w}$ then the minimum mean-squared error function can be written as:

$$J(\overline{w})=\sigma_d^2-\overline{w}^H\overline{p}-\overline{p}^H\overline{w}+R\overline{w},$$

where $\sigma_d^2$ is the variance of the desired signal d(k), R is the auto-correlation matrix of the input signal $\overline{u}$, and $\overline{p}$ is the cross-correlation between the desired signal d(k) and input $\overline{u}$.

The minimum value of $J(\overline{w})$ is:

$$\min_{\overline{w}} J(\overline{w}) = \sigma_d^2 - \overline{p}^H R\overline{p}$$

for $$\overline{w}_{optimal=R}^{-1}\overline{p}.$$

Here, $\overline{w}_{optimal}$ are the optimal weight of the filter in mean-squared sense. In LMS, the following update is used for the filter weights:

$$\overline{w}_{n+1} = \overline{w}_n + \frac{\mu}{2}\nabla J, \quad (1)$$

where ∇J is the gradient of J:

$$\nabla J = 2E[\overline{u}_k^H\{d(k) - \overline{w}_k^T\overline{u}_k\}],$$

where E denotes a statistical expectation. The term in braces in the above equation is the error between the desired and estimated signal, which can be defined as:

$$e(k) = (d(k) - \overline{w}_k^T\overline{u}_k)$$

In LMS, the statistical expectation is estimated by the instantaneous value of the gradient. Therefore:

$$\overline{w}_{k+1} = \overline{w}_k + \mu e(n)\overline{u}_k, \quad (2)$$

It has been shown that the proper choice of μ should be:

$$0 < \mu < \frac{2}{\lambda_{max}},$$

where $\lambda_{max}$ is the maximum eigenvalue of the auto-correlation matrix R. Since R is not known and, therefore, $\lambda_{max}$ is not known, one cannot necessarily choose a good value of μ. In practice, a value for μ is usually chosen by trial-and-error. The value of μ affects the filter performance. Smaller values of μ give higher signal-to-noise ratio but take more time to converge. Usually, a designer starts with a relatively large value of μ for fast initial convergence, and then chooses a smaller value for high SNR. Because stability properties have been shown to depend on the energy of the far-end signal, it is preferred to normalize the LMS approach with respect to the energy of the input signal, yielding a normalized least mean square (NLMS algorithm).

In a preferred embodiment, after convergence is achieved on the FIR filter using the above describe LMS method, the FIR filter is then truncated. When applying the novel adaptive filter system and method disclosed herein to an echo cancellation application, high sensitivity to the truncation process may be experienced. As such, inaccuracies in detecting the start and/or end of the response can degrade system performance. Accordingly, it is further preferred to truncate the converged FIR filter, take a first set of taps, K, from the truncated FIR filter, referred to as $h_{fir}$, take the last N-K taps of the truncated FIR filter, referred to as $h_{fir}$, and convert $h_{iir}$ to an IIR model, as discussed below. K is preferably at or around 10. The truncated FIR filter, $h_{fir}$, together with the IIR filter are then used, in combination, to track the system response and filter data, as further discussed below. Although preferred for adaptive filter applications in echo cancellation methods and systems, this truncation step is optional and can be eliminated for other applications.

Referring back to FIG. 1, once convergence is achieved 120, the FIR filter is converted 130 to an infinite impulse response (IIR) filter using a generalization of the ARMA-Levinson (where ARMA stands for auto-regressive moving average) approach. Digital FIR filters can only realize transfer functions with effective poles at the origin of the z-plane, while IIR filters can have poles anywhere within the unit circle. Therefore, in IIR filters, the poles can be used to improve frequency selectivity and, consequently, the required filter order is much lower for IIR as compared to FIR filters. While this should indicate that IIR filters are preferred because of their relatively small size, IIR applications have been limited, however, because of the convergence properties and issues of instability associated with IIR filters.

To one of ordinary skill in the art, the ARMA-Levinson approach is known and appreciated. The approach is a two-channel Levinson algorithm. It does not put any restriction on the number of poles and zeros, except what is required for causality: Number of poles should be greater or equal to the number of zeros. Conceptually, this process enables a FIR filter having N taps to be replaced with a stable pole-zero filter having M taps where M<N.

The input-output relationship of a long FIR filter, denoted by $$y_k = \sum_{i=0}^{N} h_i x_{k-i}$$

where y is the output, x is the input and h are the FIR filter coefficients, is approximated in an ARMA model by p poles and q zeroes, denoted by ARMA (p, q) where the output samples $y_k$ are given by the following equation:

$$y_k = -\sum_{i=1}^{N} a_i y_{k-i} + \sum_{i=0}^{N} b_i x_{k-i}.$$

The FIR to IIR filter conversion requires that we appropriately select the model order p and q. If the chosen model order is too low, then there will be unacceptable errors in modeling. If the model order is too high, then memory and computational resources may be wasted. One method of appropriately selecting the model order selection is to optimize the model order by examining the model order error. Beginning with the definition of the model order error as the mean squared difference between the FIR impulse response, h, and the pole-zero impulse response, i.e. $e = 10\log(h - \hbar)^2$, the following calculations are made:

1. Choose a model error threshold, $t_h$.
2. Choose p=q=1. Set $e > t_h$
3. While $e > t_h$ do
   a. Convert FIR to IIR using the approach described below.
   b. Compute $e = 10\log(h - \hbar)^2$
   c. p=p+1, q=q+1.

end

The impulse response of the pole-zero filter can be computed by inputting a long unit vector to the pole-zero filter. The length of this unit vector should be greater than the length of the FIR filter.

In the calculation below, define p and q as being the number of zeros and poles respectively and as having a computational complexity on the order $(2(\max(p,q)^2)$. The approach does not restrict the generated pole-zero approximation to be minimum phase. As such, zeros can lie outside the unit circle. Further, assume that p≧q.

Define:

$$-\Theta_i^j = \begin{cases} \begin{bmatrix} -a_i^j & 0 \\ 0 & 0 \end{bmatrix} : 1 \le i \le \delta - 1 \\ \begin{bmatrix} -a_i^j & b_{i-\delta}^j \\ 0 & 0 \end{bmatrix} : \delta \le i \le j. \end{cases}$$

Also, define the autocorrelation matrix:

$$R(i) = E(z_k z_{k-i}^*) = \begin{bmatrix} R_{yy}(i) & R_{yx}(i-\delta) \\ R_{xy}(i+\delta) & R_{xx}(i) \end{bmatrix} = R^*(-i),$$

Where, $$R_{yy}(l) = S_x \sum_{m=1}^{N} h_{mi} h_{m-i};\ R_{xy}(l) = S_x h_l = R_{xy}^*(-l);\ \text{and}$$

$$R_{xx}(l) = S_x \delta(l).$$

In light of the above described definitions, the algorithm follows:

Initialization:

$$\Theta_1^1 = K_1^e = -R(1)R^{-1}(0);\ \Phi_1^1 = K_1^r = -R(-1)R^{-1}(0);$$

$$\sum_1^r = \begin{bmatrix} hh^T & a^T \\ a & 1 \end{bmatrix} = \sum_1^r.$$

Recursions:

For j=1 to p−1

$\Delta_{j+1}^{e} = R(j+1) + R(j)\Theta_1^{j} + + \ldots + R(1)\Theta_j^{J};\ \Delta_{j+1}^{r} = \Delta_{j+1}^{*e}.$ $K_{j+1}^{e} = -(\Sigma_j^{r})^{-1}\Delta_{j+1}^{e}.$ $K_{j+1}^{r} = -(\Sigma_j^{e})^{-1}\Delta_{j+1}^{r}.$ $\Sigma_{j+1}^{e} = \Sigma_j^{e} + \Delta_{j+1}^{r} K_{j+1}^{e}.$ $\Sigma_{j+1}^{r} = \Sigma_j^{r} + \Delta_{j+1}^{e} K_{j+1}^{r}.$ $\Theta_i^{j+1} = \Theta_i^{j} + K_{j+1}^{e}\Phi_{j-1+i}^{j};\ 1 \leqq i \leqq j.$ $\Theta_{j+1}^{j+1} = K_{j+1}^{e}.$ $\Phi_i^{j+1} = \Phi_i^{j} + K_{j+1}^{r}\Theta_{j-1+i}^{j};\ 1 \leqq i \leqq j.$ $\Phi_{j+1}^{j+1} = K_{j+1}^{r}.$ end The coefficients of the now converted filter can be directly read from Θ.

During the transition from FIR to the IIR filter, it is preferred to correctly set the initial conditions of the IIR filter in order to avoid errors during the transition. The preferred approach is to correctly set the initial conditions by first flushing the FIR filter with a zero input signal that is equal to length, N, of the FIR filter and saving the resulting output vector, $\underline{z}$. This process places the FIR filter in its zero state. Consequently, the coefficients of the IIR filter are also initially set to zero after the conversion because the algorithmic approach described above insures both the FIR and IIR filters have the same zero state response, although not the same zero input response. The flushed output, $\underline{z}$, is added appropriately to the output of IIR filter for N samples. The addition of the output vector, $\underline{z}$, enables a proper transition from FIR to pole-zero filter.

More specifically, $$\underline{z} = [\,h_0\ \ h_1\ \ h_2\ \ \cdots\ \ h_{N-1}\,] \begin{bmatrix} x_{i+N-1} & x_{i+N-2} & \cdots & x_{i+1} & x_{i+0} \\ x_{i+N-2} & x_{i+N-3} & \cdots & x_{i+0} & 0 \\ x_{i+N-3} & x_{i+N-4} & \cdots & 0 & 0 \\ \vdots & \vdots & \cdots & 0 & 0 \\ x_{i+0} & 0 & 0 & 0 & 0 \end{bmatrix},$$

With the coefficients of the converted filter obtained, the system can filter data and, when necessary, adapt to account for the time variations in the system response, in accordance with the measured error. In systems where the typical time varying response does change enough to generate unacceptable errors, but slowly and without large magnitude variations, it is possible to achieve substantially optimal performance by just adapting the zeroes of the IIR filter and keeping the poles fixed. The adaptation process comprises adapting the zeroes of the IIR filter in accordance with an adaptation process, preferably using the LMS method previously described.

More specifically, where the flushed output, $\underline{z}$, is added appropriately to the output of IIR filter for N samples, the recursive LMS method comprises the following steps:

for k=0 to EndOfData

Figure 3:
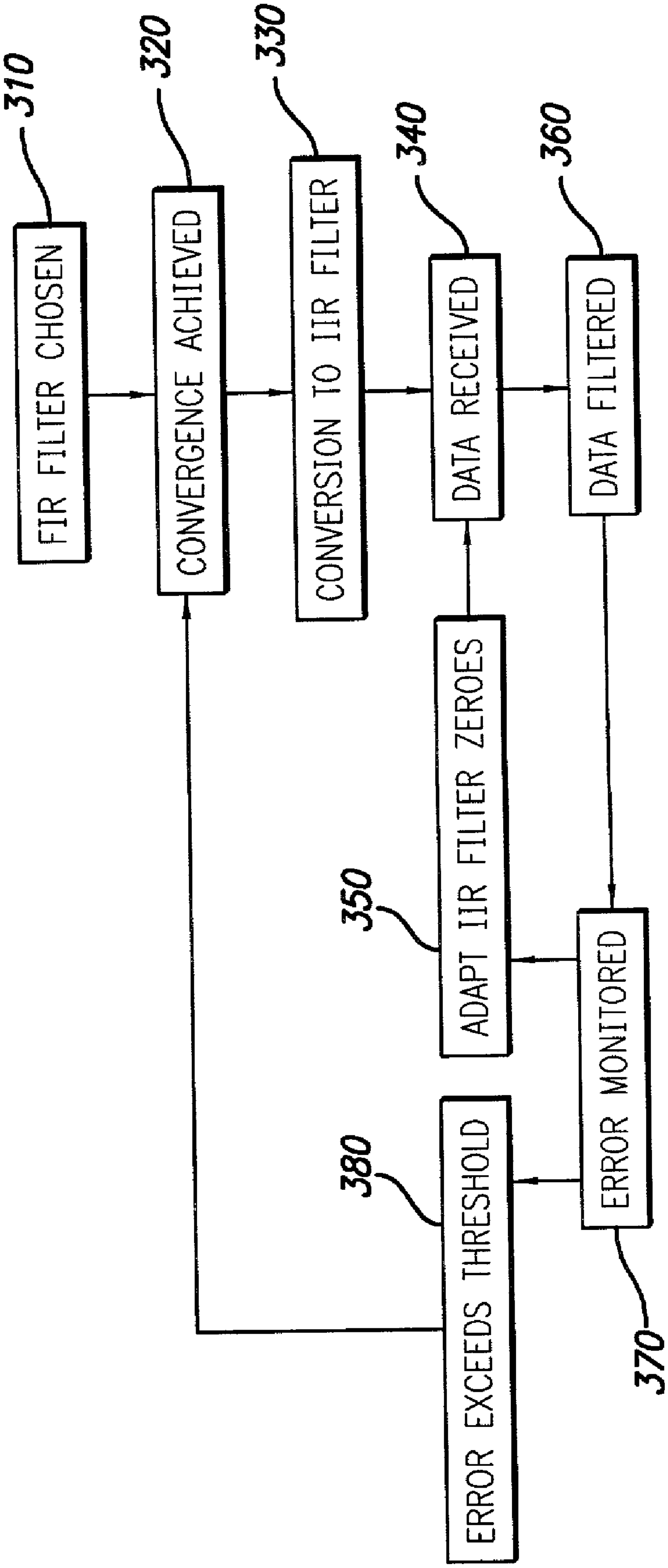
FIG. 3 is a flowchart describing the operation of a second embodiment of a novel adaptive filter method.

If k<N $$y_k = -\sum_{i=1}^{q} a_i y_{k-i} + \sum_{i=0}^{p} b_i x_{k-i} + z(k),$$

$$e_k = r_k - y_k,$$

$$\underline{b}(k+1) = \underline{b}(k) + \mu e_k \underline{x}_k$$

else $$y_k = -\sum_{i=1}^{q} a_i y_{k-i} + \sum_{i=0}^{p} b_i x_{k-i},$$

$$e_k = r_k - y_k,$$

$$\underline{b}(k+1) = \underline{b}(k) + \mu e_k \underline{x}_k$$

endif end,

In a second embodiment, the system provides for a secondary adaptation step if measured divergence error is too great. Referring now to FIG. 3, a filter, preferably an adaptive finite impulse response (FIR) filter, of an appropriate length, N, is chosen 310. Once the filter is chosen 310, convergence is achieved 320 using a convergence process, preferably a least-mean-square (LMS) approach. With convergence complete 320, the filter is converted 330 to an infinite impulse response (IIR) filter using a generalization of the ARMA-Levinson approach. In the course of operation, data is received 340 from an input source and used to adapt 350 the zeroes of the IIR filter using the LMS approach, keeping the poles fixed. The adaptation process 350 generates a set of converged filter coefficients that are then applied to the input signal to create a modified signal used to filter 360 the data. The error between the modified signal and actual signal received is monitored 370 and used to further adapt the zeroes of the IIR filter. If the measured error is greater than a pre-determined threshold 380, convergence is re-initiated by reverting back to step 320. By using this approach, extreme changes that generate errors beyond a specific magnitude can be accounted for while still enabling the system to rapidly, efficiently adjust to eliminate smaller errors by adapting the zeroes of the converted IIR filter.

The present invention provides for substantially greater performance relative to a filter system that begins with a FIR filter, converts to an IIR filter, and, when further adaptation is necessary to account for system changes, goes back to a FIR filter, reconverges as a FIR filter, and then reconverts to an IIR filter. When faced with a need to adapt, this system does not adapt its poles and zeros. Any changes in the impulse response after pole-zero or IIR modeling will render the model useless, necessitating a return to the initial FIR convergence step. This increases implementation complexity significantly and adversely affects memory usage and memory bandwidth. Furthermore, because impulse response changes are expected in certain applications, such as acoustic echo cancellation, line echo cancellation, and channel equalization, where the system response changes over time, it is important that the filter model be able to readily adapt to such changes. In this case, it would be highly preferable for the system to be able to adapt as an IIR filter and thereby avoid having to switch between FIR and IIR filters and adversely impact the memory bandwidth and computational resources required.

Figure 4:
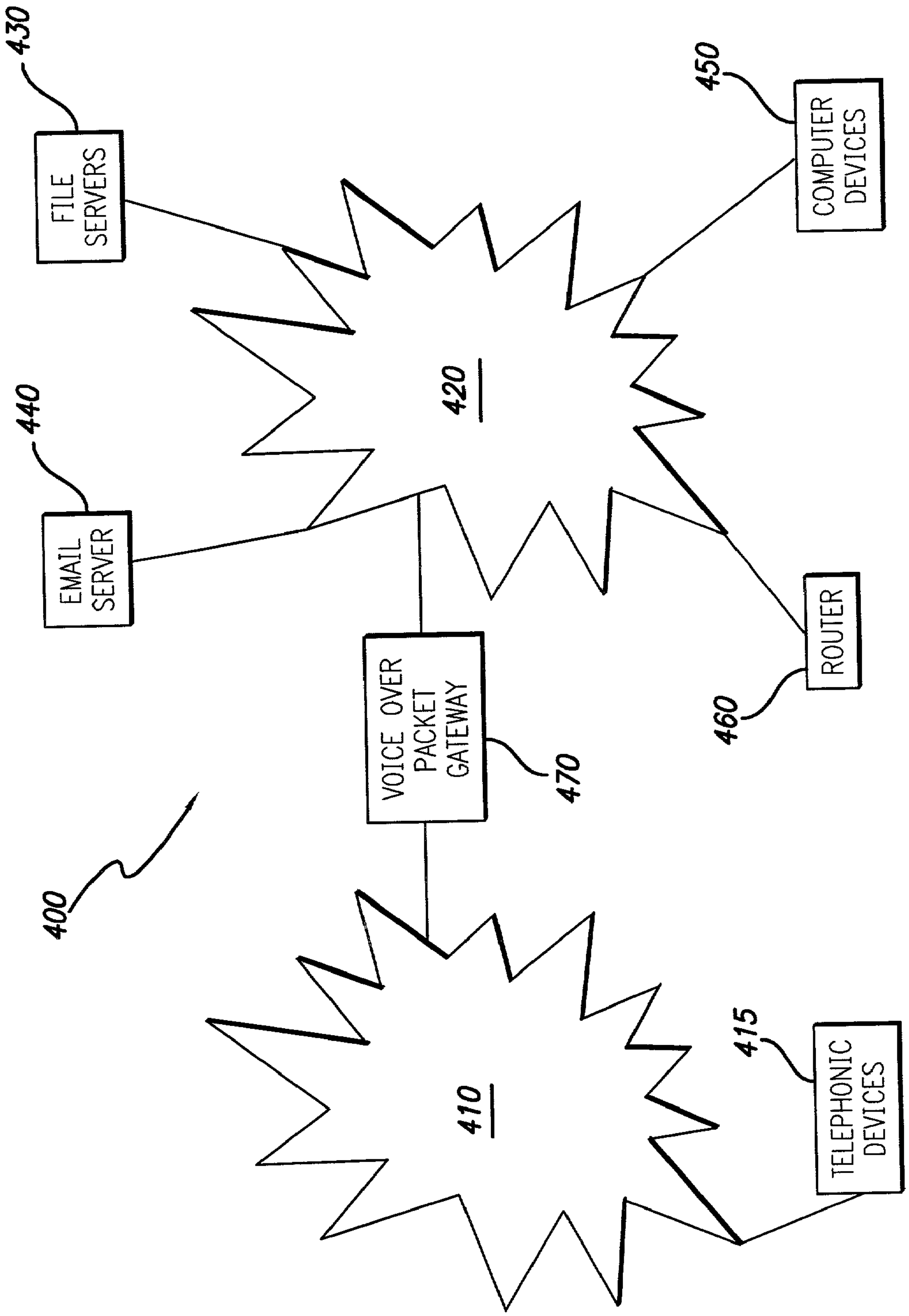
FIG. 4 is a block diagram of a telecommunication system having a voice over packet gateway.

The novel adaptive filter method and system can be effectively deployed in a telecommunications system in the form of novel echo cancellation methods and systems to effectuate high quality communications, particularly as between users of a public switched telephone network (PSTN) and users of a packet-based network (e.g., the Internet). Referring to FIG. 4, a telecommunication system 400 is shown comprising a PSTN 410 having a plurality of telephonic systems 415 (e.g., telephones and fax machines) and a packet based network 420 having a plurality of networked systems (e.g., file servers 430, email servers 440, computers 450) linked via routers 460. Mediating between the two networks is a gateway 470 comprising a plurality of echo cancellation devices capable of substantially reducing echo generated by the movement of received inputs through various cross-coupling pathways, and a plurality of digital to analog and analog to digital encoders and decoders. Because of the potential volume of signals traveling through such a system 400, echo cancellation can be occurring on numerous channels, carrying different signals, concurrently. It is therefore important to optimize echo cancellation in a manner that reduces the computational complexity and memory requirements associated with the echo cancellation process. The novel adaptive filter method and system provided herein can be used to achieve such a result.

Figure 5:
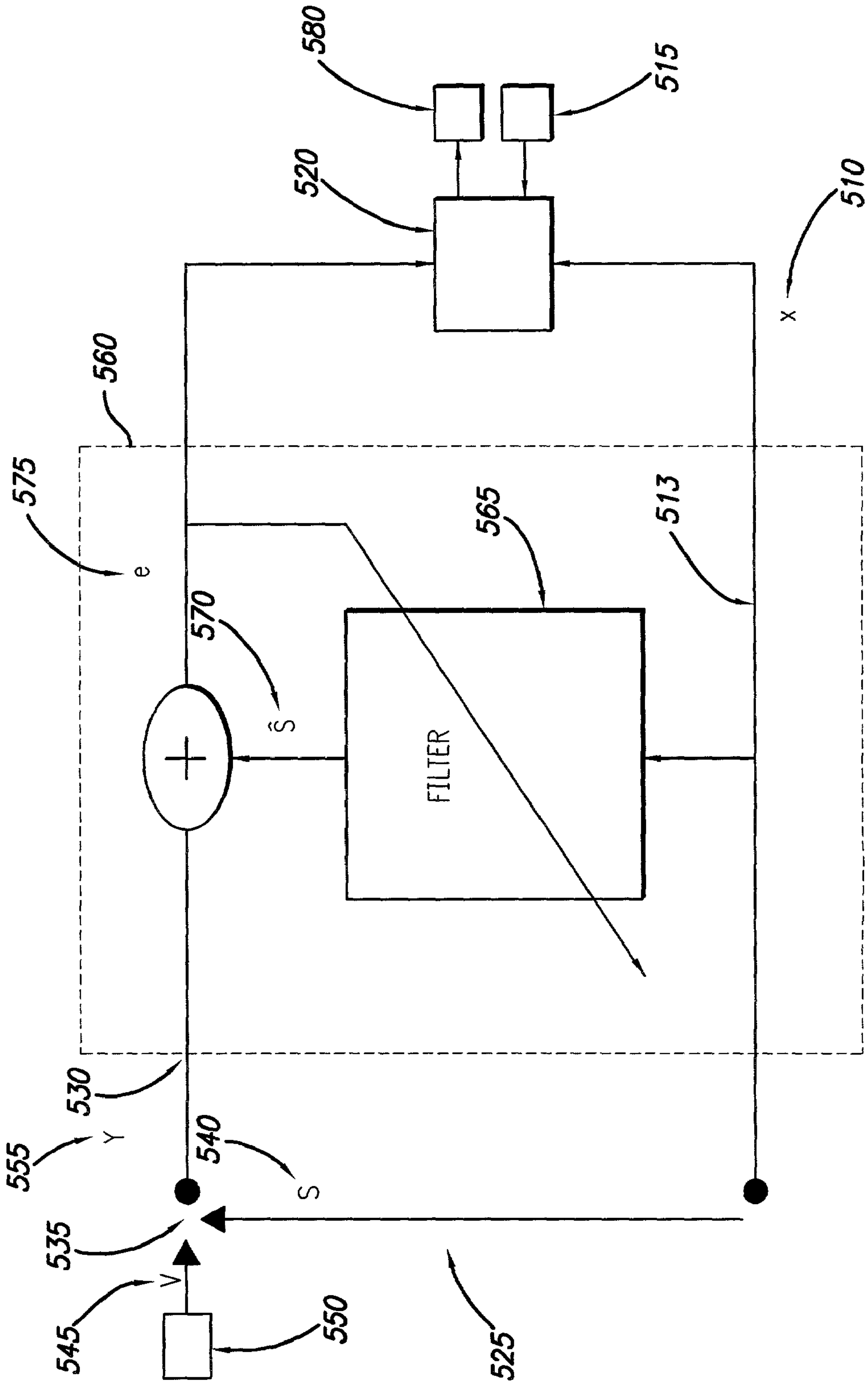
FIG. 5 is a block diagram of an echo cancellation system.

Referring to FIG. 5, a far-end signal x 510 from a far-end source 515 is received locally at a communication input 520. As a result of the previously noted imperfections in the local system, a portion of the signal x 510 is echoed back to a transmit line 530 via a cross-coupling path 525 that intersects with the transmit line 530 at an input 535. In the course of engaging the cross-coupling path 525, whether an acoustic or line echo pathway, the signal x 510 undergoes a transformation, as a function of an impulse response, that modifies the original signal x 510 into a new signal s 540, referred to herein as the echo response 540. The echo response 540 is illustrated here as a signal s 540 corresponding to the following equation:

$$s=h*x$$

where h is the impulse response of the echo characteristics.

Also being communicated through the transmit line 530 is a near-end signal v 545, communicated from a near-end source 550. The input signal v 545 combines with the echo response s 540 to generate a combined signal y 555. Therefore, the signal sent from the near-end source 550 to the far-end receiver 580, absent echo cancellation, is the signal y 555, which is the sum of the near-end signal v 545 and the echo response s 540.

To reduce and/or eliminate the echo response component s 540 from the signal y 555, the a typical system uses an echo canceller 560 having a filter 565 that is capable of applying an impulse response $\hat{h}$, which is an estimate of the actual impulse echo response h experienced by the far-end signal x 510 as it engages the cross-coupling path 525. As such, a further signal $\hat{s}$ 570 representing an estimate of echo response s 540 is generated by the echo canceller 560 in accordance with the following equation:

$$\hat{s}=\hat{h}*x$$

The echo canceller 560 subtracts the echo estimate signal $\hat{s}$ 570 from the signal y 555 to generate a signal e 575 that is returned to the far-end receiver 580. The signal e 575 thus corresponds to the following equation:

$$e=s+v-\hat{s}\approx v$$

The signal returned to the far end receiver 580 is therefore dominated by the signal v of the near-end source 550. To the extent the impulse response $\hat{h}$ more closely correlates to the actual echo impulse response h, then $\hat{s}$ 570 more closely approximates s 540, resulting in the minimization of the magnitude of the echo signal component s 540 on the signal e.

An adaptive filter 565 is used to generate the echo signal component $\hat{s}$ 570. In its simplest form, the adaptive filter 565 generates an echo estimate, i.e. $\hat{s}$ 570, by obtaining individual samples of the far-end signal x 510 on a receive path 513, convolving the samples with an impulse response model of the system, i.e. $\hat{h}$, and then subtracting, at the appropriate time, the resulting echo estimate, $\hat{s}$ 570, from the received signal y 555 on the transmit channel 530. The conventional adaptive filter is a FIR filter using a LMS method for achieving tap convergence.

Figure 6:
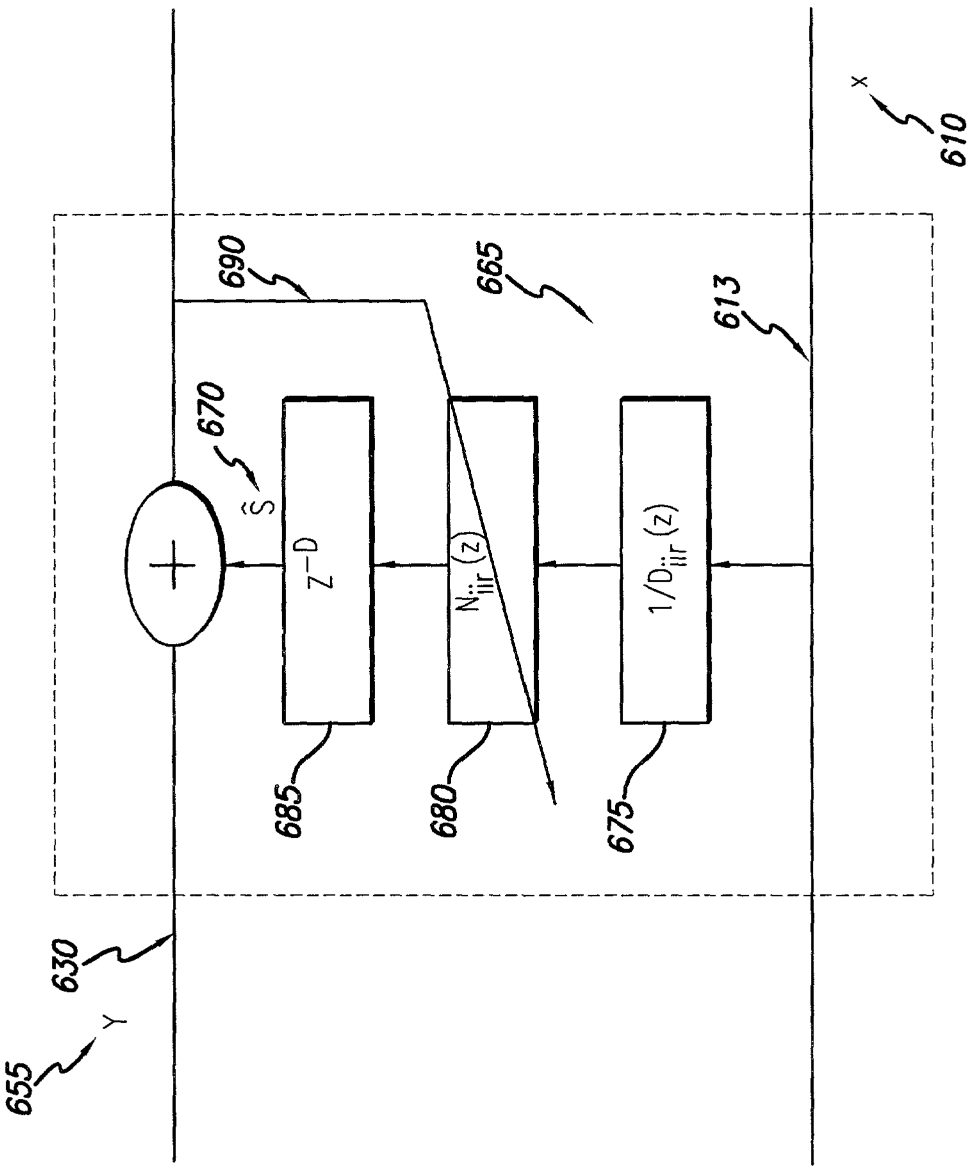
FIG. 6 is a block diagram of a novel adaptive filter for use in the echo cancellation system of FIG. 5.

The novel adaptive filter method and system presented herein can be used to improve the calculation of the echo impulse response $\hat{h}$ by, among other things, reducing the computational complexity and memory requirements of the tap calculation conducted within the adaptive filter. Shown in FIG. 6, an embodiment of the novel filter 665 of the present invention is used to generate the echo signal component $\hat{s}$ 670. After having achieved convergence on a FIR filter and converted the filter to an IIR filter, in accordance with the previously described methodology, the adaptive filter 665 generates an echo estimate i.e. $\hat{s}$ 670, by obtaining individual samples of the far-end signal x 610 on a receive path 613, convolving the samples with the calculated taps, and then subtracting, at the appropriate time, the resulting echo estimate, $\hat{s}$ 670, from the received signal y 655 on the transmit channel 630. On going adaptation of the filter occurs by the adjustment of the zeroes of the IIR filter, represented by the arrow 690 extending through element 680 (where $N_{iir}(z)$ denotes the numerator portion of the IIR filter), and not by updating the denominator 675. To match the delay incurred due to conversion of the FIR filter into an IIR filter, a delay where D−1 is a specific value of delay is applied. The signal $\hat{s}$ 670 is produced as a function of the transfer function denoted by $z^{-D}$ 685.

As discussed above, to avoid degrading system performance through inaccuracies in detecting the start and/or end of the response, it is preferred in echo cancellation applications to truncate the converged FIR filter, take a first set of taps, K, from the truncated FIR filter, referred to as $h_{fir}$, take the last N-K taps of the truncated FIR filter, referred to as $h_{iir}$, and convert $h_{iir}$ to an IIR model, where K is preferably at or around 10. The truncated FIR filter, $h_{fir}$, together with the IIR filter are then used, in combination, to track the system response and filter data.

Figure 7:
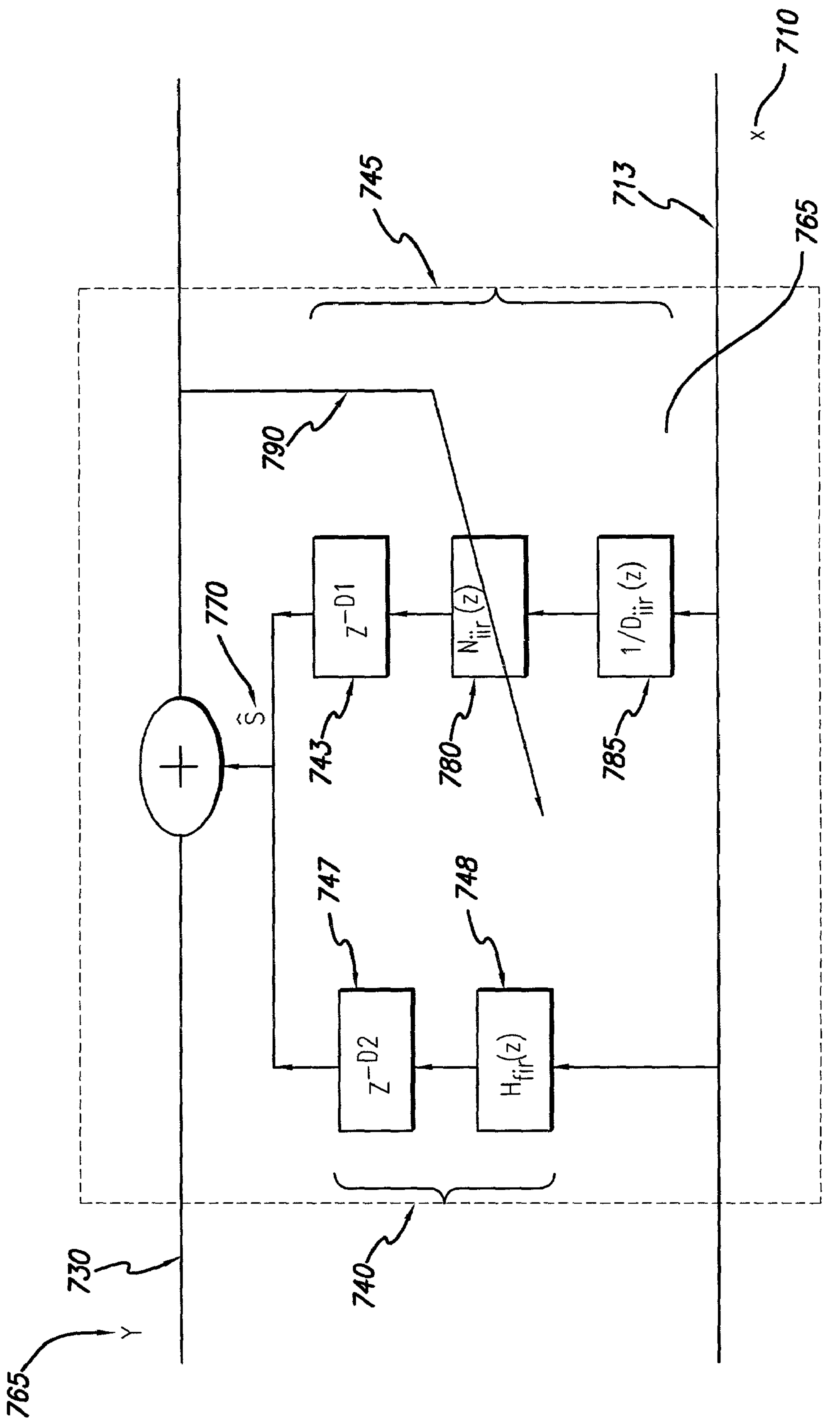
FIG. 7 is a block diagram of a second novel adaptive filter for use in the echo cancellation system of FIG. 5.

Referring now to FIG. 7, a second embodiment of the novel filter 765 of the present invention is used to generate the echo signal component $\hat{s}$ 770. After having achieved convergence on a FIR filter, dividing the filter taps into an initial K tap and a subsequent N-K coefficients, and converting a portion of the FIR filter to an IIR filter corresponding to the N-K taps, in accordance with the previously described methodology, the adaptive filter 765 generates an echo estimate i.e. $\hat{s}$ 770, by utilizing both the truncated FIR filter 740, comprising $H_{fir}(z)$ 748, and the IIR filter 745. On going adaptation of the IIR filter 745 occurs by the adjustment of the zeroes of the IIR filter, represented by the arrow 790 extending through element 780 (where $N_{iir}(z)$ denotes the numerator portion of the IIR filter), and not by updating the denominator 785. To match the delay incurred due to conversion of the FIR filter into an IIR filter, a delay where D1−1 is a specific value of delay is applied. The signal $\hat{s}$ 770 is produced as a function of the transfer functions denoted by $z^{-D1}$ 743 and $z^{-D2}$ 747.

Figure 8:
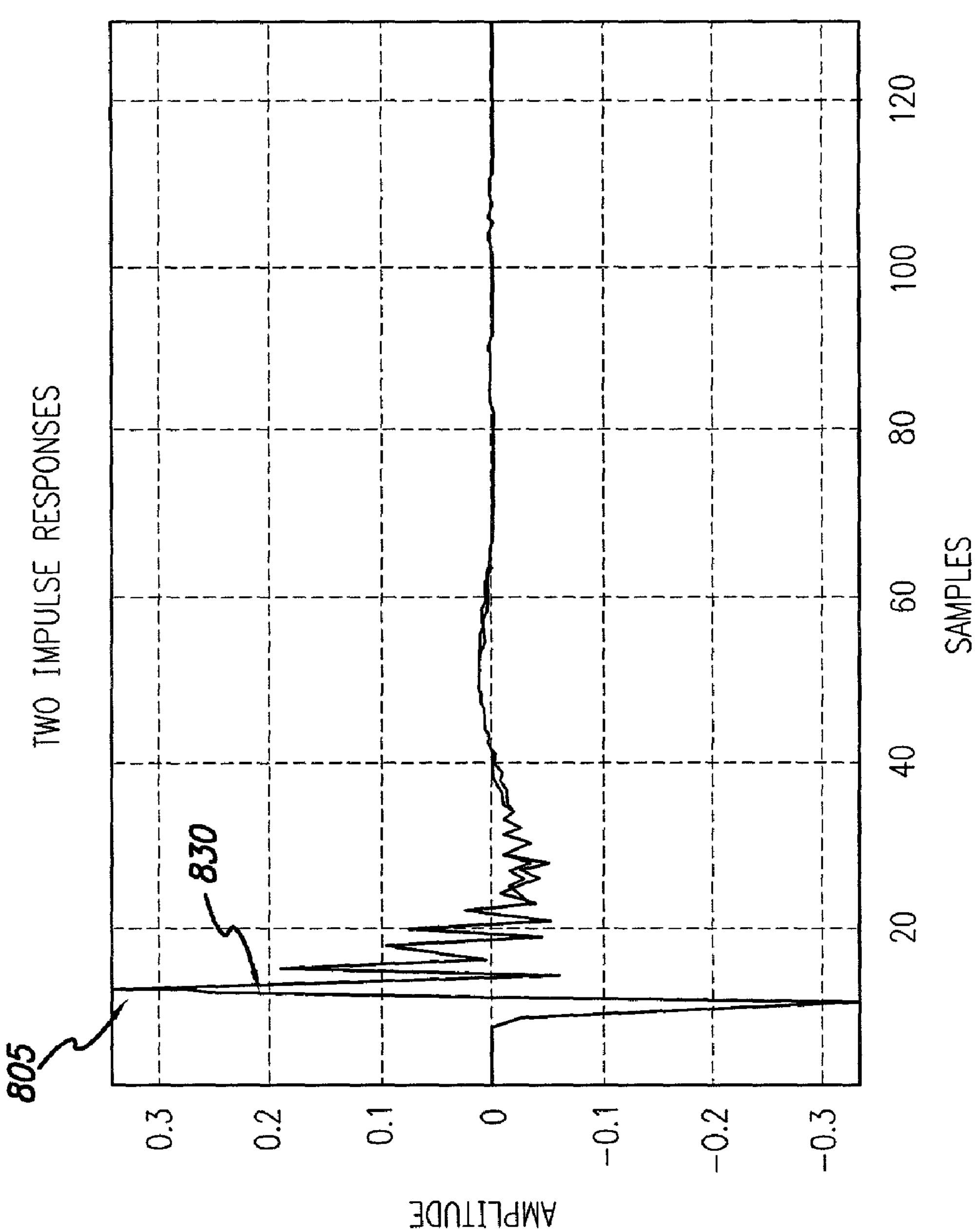
FIG. 8 is a chart comparing two exemplary echo responses based upon sample number relative to amplitude.
Figure 9:
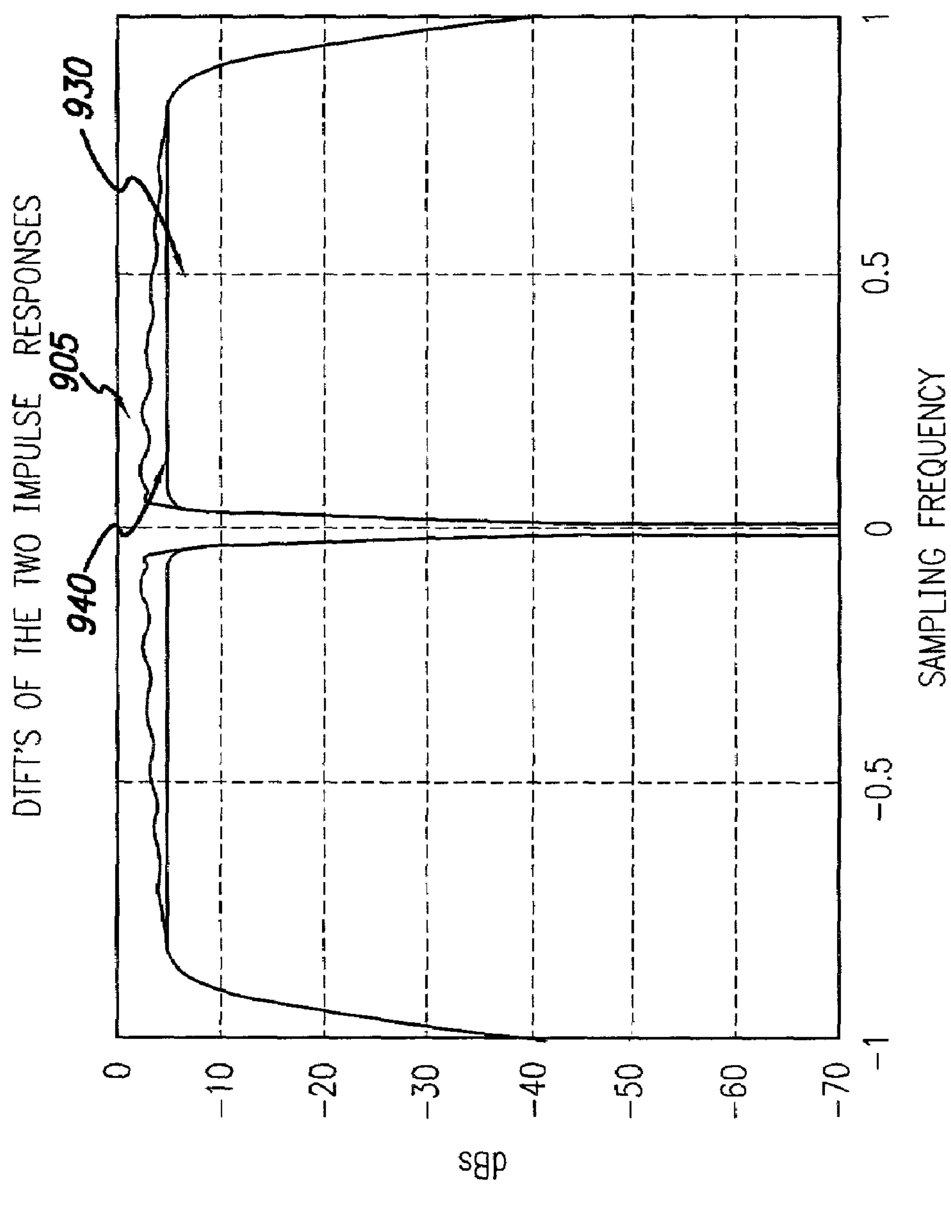
FIG. 9 is a chart comparing the frequency response of two exemplary echo responses

Operationally, the novel echo cancellation application has achieved superior performance results in the form of computational savings and decreased filter length. An FIR filter of length N=512 was chosen, converged, and truncated according to the description provided above. The FIR filter was converted to an IIR filter using a pole-zero filter model of p=50 and q=50. To evaluate the ability of the echo cancellation system to adapt to changes over time, two actual hybrid responses, shown as 805, 830 in FIG. 8 and as 905, 930 in FIG. 9, were generated in a PSTN due to an impedance mismatch of a four-wire to two-wire converter and recorded at two different times with an interval of 30 minutes. The two impulse responses 805/905, 830/930 demonstrate that, over time, changes do occur in an impulse response requiring an echo cancellation system, and more specifically, an adaptive filter, to adjust over time. Although on the order of $10^{-3}$ 940, the differences are sufficient to cause a converged system to generate, over time, a measured error that is unacceptable.

Figure 10:
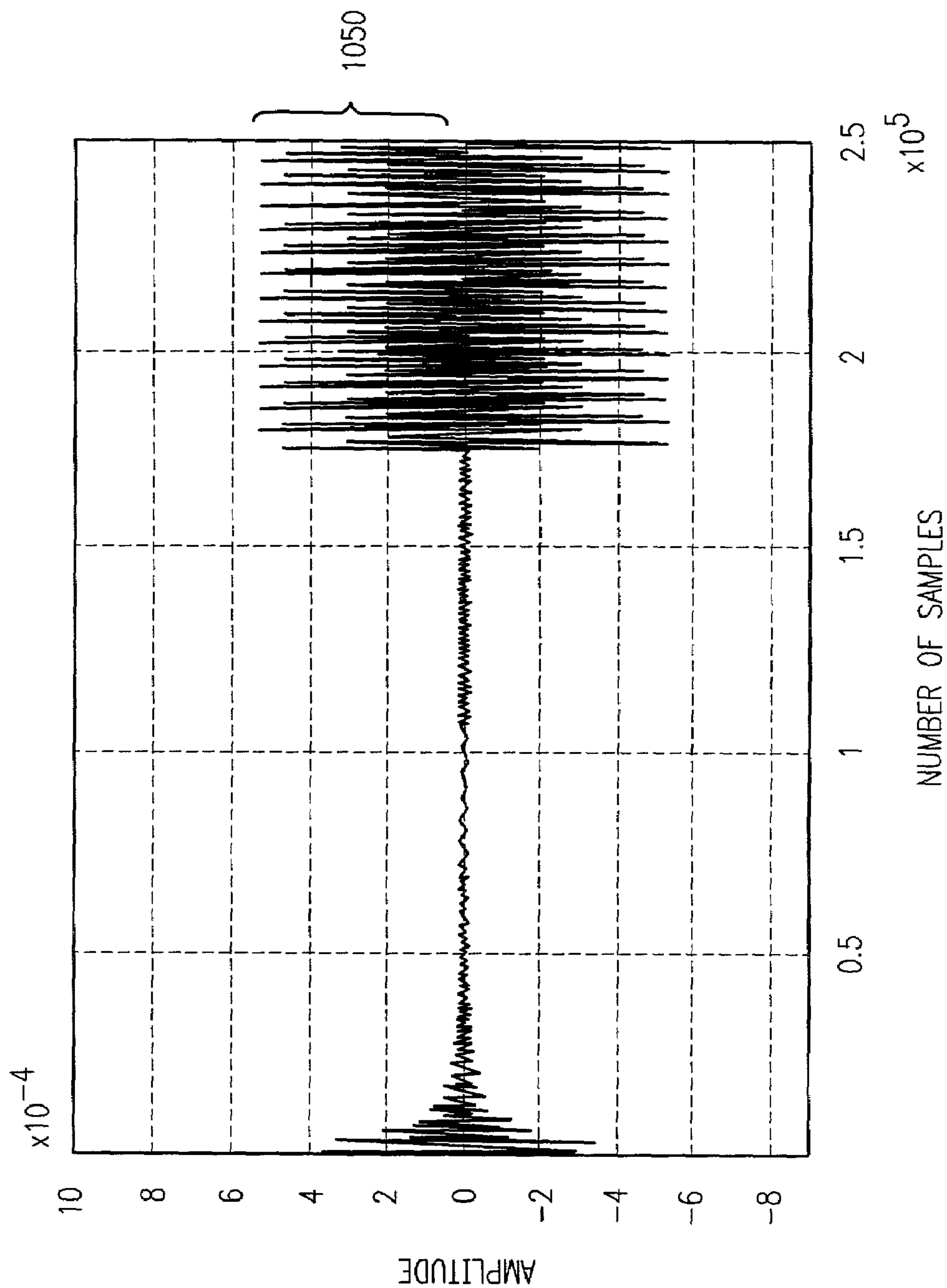
FIG. 10 is a chart of residual error generated over a range of sample numbers relative to amplitude where no adaptive filter is used.
Figure 11:
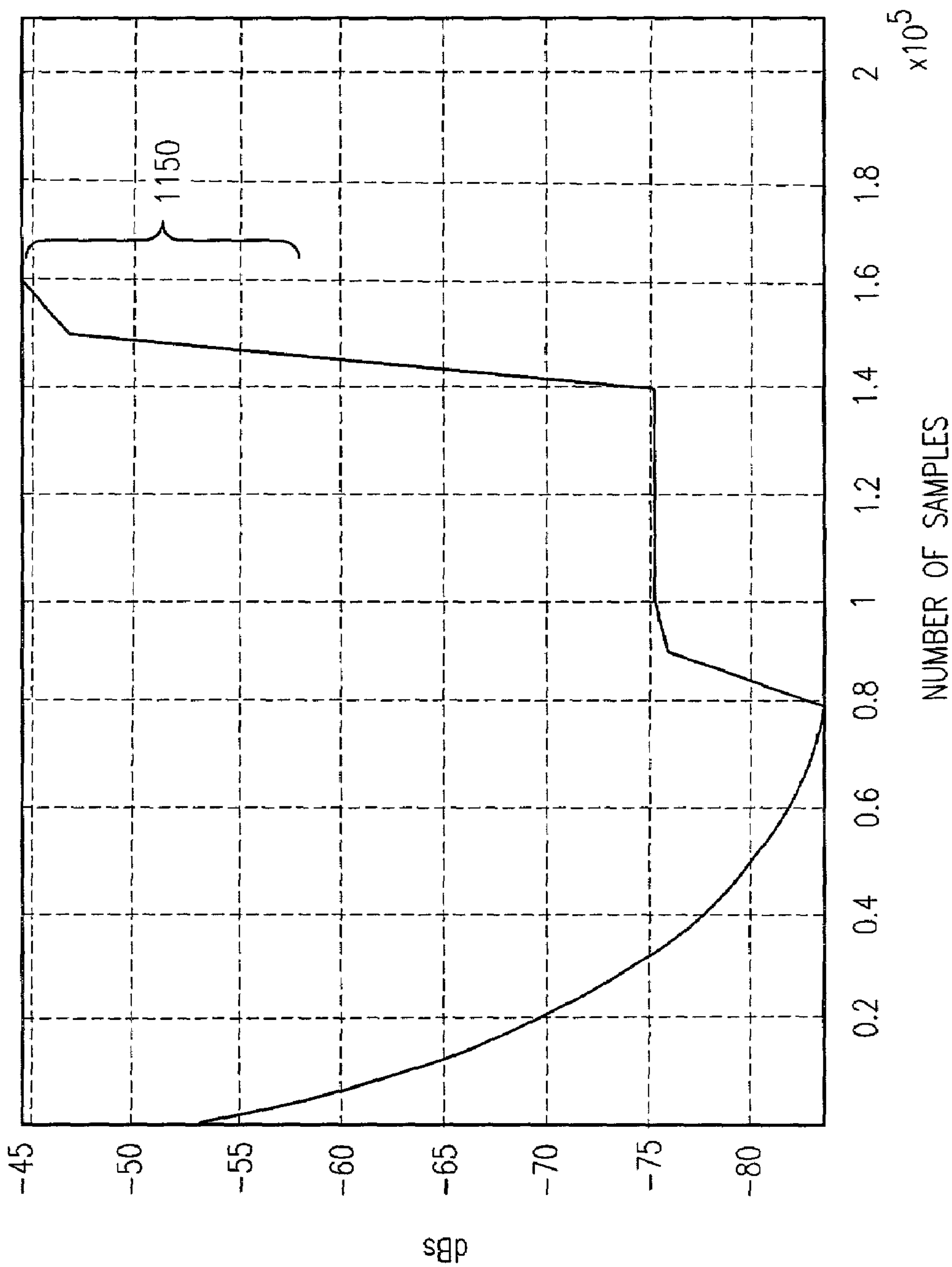
FIG. 11 is a chart of residual error generated over a range of sample numbers relative to decibels where no adaptive filter is used.
Figure 12:
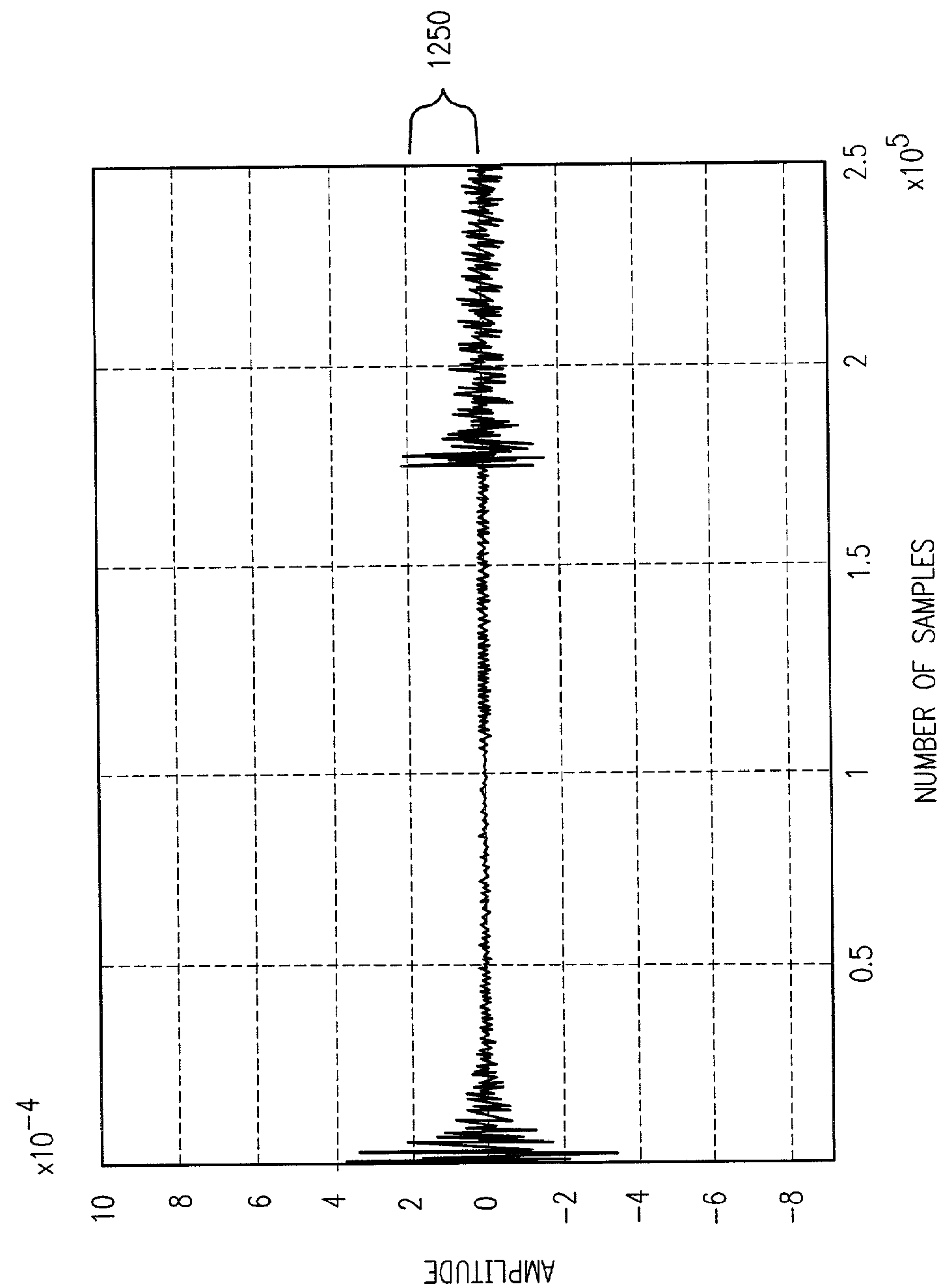
FIG. 12 is a chart of residual error generated over a range of sample numbers relative to amplitude where one embodiment of an adaptive filter of the present invention is used.
Figure 13:
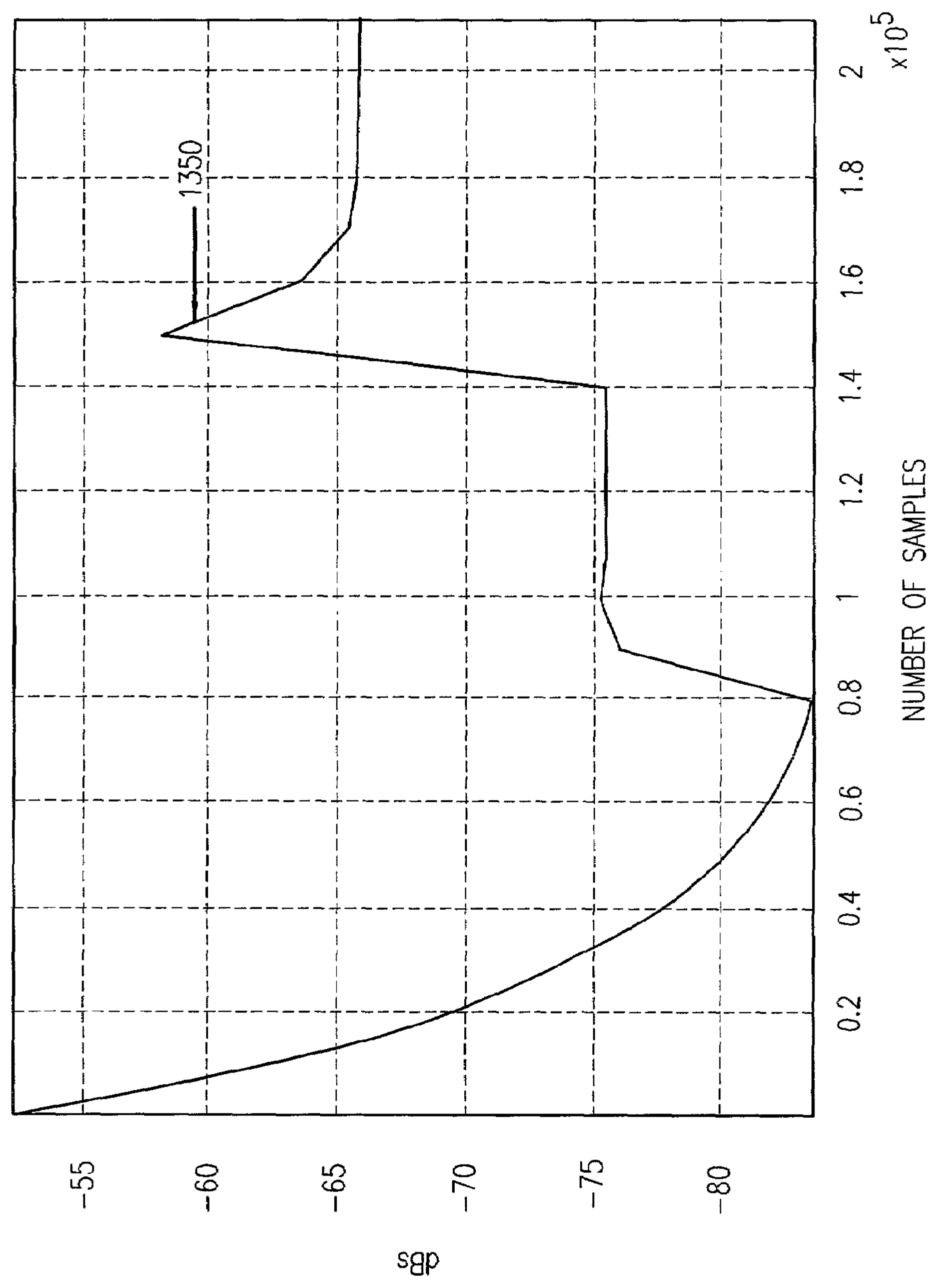
FIG. 13 is a chart of residual error generated over a range of sample numbers relative to decibels where one embodiment of an adaptive filter of the present invention is used.

Without an adaptive filter, as shown in FIGS. 10 and 11, when the impulse response is switched close to 175,000 samples, the error 1050, 1150 increases significantly and to unacceptable levels. The error is measured in amplitude in FIG. 10 and in decibels in FIG. 11. Conversely, when the echo cancellation system employs one embodiment of the novel adaptive filter system claimed herein, the error 1250, 1350 shows an increase due to a shift in the impulse response but, unlike with a no-adaptive filter case, is at or below acceptable levels. If the filter order were increased, the error level would be further decreased, although memory requirements and computational resource needs would increase.

The present adaptive filter method and system can be employed in numerous applications employing adaptive processes in conjunction with convolutional coding. Accordingly, another embodiment of the present invention includes a novel method and system for channel equalization. Equalizers are a class of communication system devices used to compensate for distortion experienced in communication channels. Fixed equalizers have the average electrical characteristics of the channel pre-determined and a fixed amount of equalization is therefore designed into the equalizer to compensate for the distortion. Adjustable equalizers monitor the channel and provide for equalization that varies, as necessary, to match the distortion determined at the time of monitoring. Adjustable equalizers, also known as adaptive equalizers, can provide for the adaptation using an adaptive process that employs convolutional coding to generate a signal inverse to the distortion, an equalizing signal.

Applied to a channel equalization application, the present invention is used to generate the equalizing signal by achieving convergence on a FIR filter, converting the filter to an IIR filter, in accordance with the previously described methodology and generating an equalizing signal by obtaining samples of a received signal and convolving the samples with the calculated taps. The channel equalizer then applies, at the appropriate time, the resulting equalizing signal to the received signal. Ongoing adaptation of the filter occurs by the adjustment of the zeroes of the IIR filter and not by updating the filter denominator. To match the delay incurred due to conversion of the FIR filter into an IIR filter, a delay is applied. To avoid degrading system performance through inaccuracies in detecting the start and/or end of the response, it is preferred to truncate the converged FIR filter, take a first set of taps, K, from the truncated FIR filter, referred to as $h_{fir}$, take the last N-K taps of the truncated FIR filter, referred to as $h_{iir}$, and convert $h_{iir}$ to an IIR model, where K is preferably at or around 10. The truncated FIR filter, $h_{fir}$, together with the IIR filter are then used, in combination, to track the system response and filter data. Ongoing adaptation of the IIR filter occurs by the adjustment of the zeroes of the IIR filter and not by updating the IIR filter denominator. To match the delay incurred due to conversion of the FIR filter into an IIR filter, a delay is applied, where D1−1 is a specific value of delay.

The present methods and systems provide for an adaptive filter that significantly reduces the memory requirement, memory bandwidth, and computational resources necessary to operate the filter. Applied to the problem of echo cancellation, embodiments of the present invention obtained a reduction of computational resource usage of roughly 10 times while maintaining an acceptable performance level. While various embodiments of the present invention have been shown and described, it would be apparent to those skilled in the art that many modifications are possible without departing from the inventive concept disclosed herein. For example, the adaptive filter has been applied in an echo cancellation application. It would be appreciated by one of ordinary skill in the art that the filter can be used in any application where the convergence, stability, computational requirements, and memory bandwidth characteristics of the novel filtration method and system could be effectively applied.

What is claimed is:

1. An adaptive filter, comprising:

a finite impulse response (FIR) filter having a plurality of FIR coefficients wherein said FIR coefficients are determined by deriving a FIR filter having a predetermined number of coefficients, obtaining convergence of said coefficients, dividing said coefficients into a first set of coefficients and a second set of coefficients, and adopting the first set of coefficients as the FIR coefficients; and an infinite impulse response (IIR) filter having a plurality, of IIR coefficients wherein said IIR coefficients have a plurality of poles and a plurality of zeroes and are derived from said second set of FIR coefficients.

2. The adaptive filter of claim 1 wherein the zeroes of the IIR coefficients are updated based upon an error input signal.

3. The adaptive filter of claim 1 wherein the poles of the IIR coefficients are fixed.

* * * * *